United States Patent
Perets et al.

(10) Patent No.: US 8,254,864 B1
(45) Date of Patent: Aug. 28, 2012

(54) DECREASING USER EQUIPMENT MEASUREMENT TIME

(75) Inventors: Yona Perets, Raanana (IL); Javier Frydman, Tel Mond (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 1048 days.

(21) Appl. No.: 12/186,262

(22) Filed: Aug. 5, 2008

Related U.S. Application Data (60) Provisional application No. 60/954,940, filed on Aug. 9, 2007.

(51) Int. Cl.
*H04B 17/00* (2006.01)
(52) U.S. Cl. .................................. 455/226.1; 455/67.11
(58) Field of Classification Search .................. 455/63.1, 455/423, 67.11, 446, 226.1, 278.1, 296
See application file for complete search history.

(56) References Cited

U.S. PATENT DOCUMENTS

| | | | | |
|---|---|---|---|---|
| 6,028,549 | A * | 2/2000 | Buckreuss et al. | 342/159 |
| 7,003,029 | B2 * | 2/2006 | Doetsch et al. | 375/232 |
| 7,079,613 | B2 * | 7/2006 | Birru | 375/354 |
| 7,133,686 | B2 * | 11/2006 | Hundal et al. | 455/465 |
| 8,060,102 | B2 * | 11/2011 | Gazzola | 455/446 |

* cited by examiner

*Primary Examiner* — Sonny Trinh (57) ABSTRACT

A radio frequency (RF) receiver that reduces the total time required to generate communication channel received signal strength estimates, e.g., RSSI, RSRP, etc., for a plurality of communication channels. A received RF signal may be processed in the frequency domain to generate a power density spectrum for an RF spectrum frequency range that encompasses a plurality of communication channels. A communication channel received signal strength estimate may be generated based on the generated power density spectrum for each communication channels within the RF spectrum frequency range. Receiver RF bandwidth limitations may be overcome by dividing the RF spectrum frequency range into segments which may be separately processed by the RF receiver to produce communication channel received signal strength estimates for the communication channels within each RF spectrum segment. The respective RF spectrum segments may be processed in series, and/or in parallel, depending on the RF receiver configuration embodiment employed.

19 Claims, 8 Drawing Sheets

DECREASING USER EQUIPMENT MEASUREMENT TIME

INCORPORATION BY REFERENCE

This application claims the benefit of U.S. Provisional Application No. 60/954,940, "DECREASING UE MEASUREMENT TIME," filed by Yoni Perets and Javier Frydman on Aug. 9, 2007, which is incorporated herein by reference in its entirety.

BACKGROUND

A cellular communication network allows individual cellular radio frequency (RF) transceivers, or user equipment, to establish a connection to the cellular communication network via one of many cellular communication network base stations. User equipment may periodically generate a received signal strength estimate, for example, a received signal strength indicator (RSSI) or a reference symbol received power (RSRP), for a communication channel signal received from a base station. Such generated received signal strength estimates may be communicated from a user equipment device to a cellular base station for use by the cellular base station in, for example, handing off a connection with the user equipment device to another base station to facilitate mobility and/or as part of transmit power control (TPC) process that reduces interference between transmitting devices by coordinating the transmission power of user equipment devices transmitting within a common transmission area.

Conventionally, a received signal strength estimate is measured by a user equipment device by tuning a receiver within the user equipment device to a channel and ascertaining the signal strength for the tuned channel. Using such techniques, if a received signal strength estimate is needed for multiple channels, a user equipment device sequentially tunes the user equipment device receiver to each respective channel and ascertains the signal strength for each respective channel for which the receiver is tuned. Unfortunately, the process of tuning a user equipment device receiver to a desired channel is a relatively resource and time intensive process compared to the process of measuring a received signal strength of the tuned channel. Therefore, using such conventional techniques, producing received signal strength values, such as an RSSI and an RSRP, for channels within 20 MHz of bandwidth with a channel raster of 200 kHz requires 100× more time than would be required to generate a received signal strength for a single channel. The processing time required to generate received signal strength values for multiple channels may be further increased in emerging communications standards, e.g., 3rd Generation Partnership Project (3GPP) Long Term Evolution (LTE) standards, such as Orthogonal Frequency-Division Multiple Access (OFDMA), in which multiple access is achieved by defining user equipment channels that use non-contiguous frequencies distributed over a relatively wide frequency band.

Hence, anted exists for approaches that reduce the processing time needed for a user equipment device to generate measures of received signal strength for multiple communication channels.

SUMMARY

A radio frequency (RF) receiver reduces the total time required to generate communication channel received signal strength estimates, e.g., RSSI, RSRP, etc., for a plurality of communication channels. A received RF signal may be processed in the frequency domain to generate a power density spectrum for an RF spectrum frequency range that encompasses a plurality of communication channels. A communication channel received signal strength estimate may be generated based on the generated power density spectrum for communication channels within the RF spectrum frequency range. Receiver RF bandwidth limitations may be overcome by dividing the RF spectrum frequency range into segments which may be separately processed by the RF receiver to produce communication channel received signal strength estimates for the communication channels within each RF spectrum segment. The respective RF spectrum segments may be processed in series, and/or in parallel, depending on the RF receiver configuration embodiment employed.

One example embodiment of the described user equipment for use on a cellular communication network may include, a receiver front end that receives a bandwidth that includes a plurality of communication channels, a power density spectrum estimation module that generates a power density spectrum for the communication channels received over the bandwidth, and a channel signal strength estimation module that generates a measure of channel signal strength for each of the plurality of communication channels based on the power density spectrum.

Another embodiment of the described user equipment for use on a cellular communication network may include, a plurality of receivers, and each receiver may include a receiver front end that receives a bandwidth that includes a plurality of communication channels, a power density spectrum estimation module that generates a power density spectrum for the communication channels received over the bandwidth, and a channel signal strength estimation module that generates a measure of channel signal strength for each of the plurality of communication channels based on the power density spectrum, in which each of the plurality of receivers is configured to receive and process a different bandwidth.

One example embodiment of a method of generating measures of channel signal strength for channel signals received by user equipment on a cellular communication network may include, receiving a bandwidth that includes a plurality of communication channels, generating a power density spectrum for the communication channels received over the bandwidth, and generating a measure of channel signal strength for each of the plurality of communication channels based on the power density spectrum.

BRIEF DESCRIPTION OF THE DRAWINGS

Example embodiments of an RF receiver with improved communication channel received signal strength estimation capability will be described with reference to the following drawings, wherein like numerals designate like elements, and wherein.

DETAILED DESCRIPTION OF EMBODIMENTS

Figure 1:
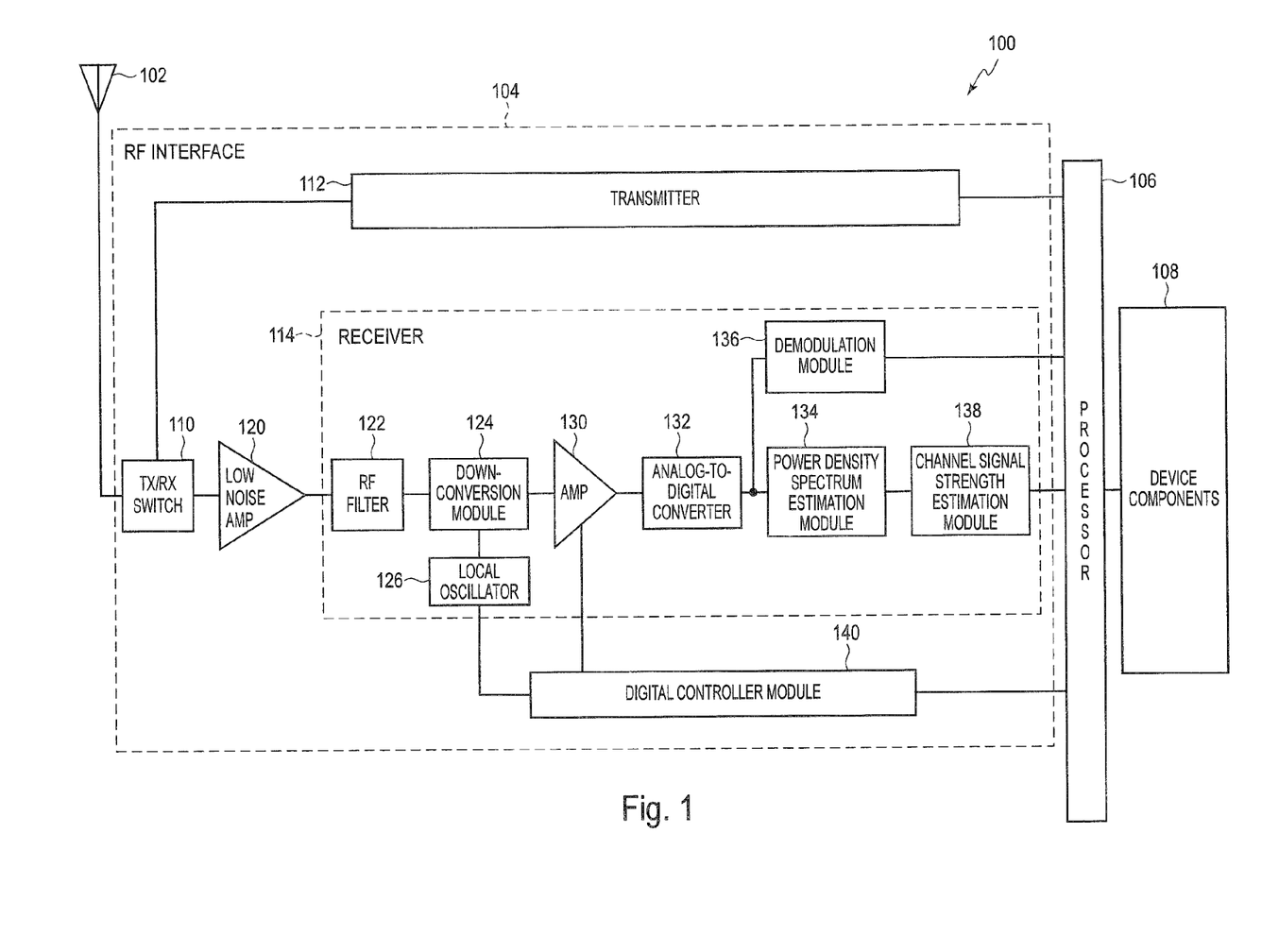
FIG. 1 is a block diagram of a first example of an RF receiver with improved communication channel received signal strength estimation capability.

FIG. 1 is a system level block diagram of a first example of a cellular radio frequency (RF) transceiver, or user equipment, with a receiver that includes the described communication channel received signal strength estimation capability. As shown in FIG. 1, RF transceiver 100 may include an RF antenna 102, an RF interface 104, a processor 106 and device components 108. RF interface 104 may include a transmitter/receiver switch 110, a low noise amplifier 120, a transmitter 112, a receiver 114 and a digital controller module 140. Receiver 114 may include an RF filter 122, a down-conversion module 124, a local oscillator 126, an amplifier 130, an analog-to-digital converter 132, a power density spectrum estimation module 134, a demodulation module 136, and a channel signal strength estimation module 138. In the example embodiment shown in FIG. 1, RF filter 122, down-conversion module 124, local oscillator 126, amplifier 130, and analog-to-digital converter 132, may be referred to collectively as an example embodiment of a receiver front end.

Although not shown in FIG. 1, in a typical RF transceiver, device components 108 may include features such as a device memory, a rechargeable battery, and a user interface which may include a display, a keyboard, a speaker and/or microphone and a data interface unit. Further, processor 106 may execute numerous signal analysis processes that may be used to generate and manage control parameters used by processor 106 to control operation of transmitter 112 and receiver 114.

In operation as a transmitter, processor 106 may receive from device components 108, for example, digitized voice data generated by a local user via a microphone and voice digitizer included in device components 108. Processor 106 may generate and pass to transmitter 112 a digital voice data stream and/or a digital data stream based on input received from device components 108. Processor 106 may also pass to transmitter 112 transmission control data generated by control processes executed by processor 106. For example, such control data may allow transmitter 112 to generate and transmit, via antenna 102, an RF signal at a predetermined frequency and power level containing the data provided by processor 106 to transmitter 112.

In operation as a receiver, processor 106 may receive from demodulator 136 a demodulated data stream containing, for example, digitized voice data and/or digitized data received by RF transmission from a remote transmitter, or base station, and may receive from channel signal strength estimation module 138 one or more channel received signal strength estimates. Processor 106 may pass the digitized voice/data stream to device components 108 which may process the digital voice data using a digital-to-analog converter and may use the generated analog signal to drive a speaker within the user interface and/or may direct the digital data to an appropriate data destination. Further, processor 106 may communicate with digital controller module 140 to provide phase adjustment, e.g., phase lock loop information, to local oscillator 126 and to provide automatic gain control information to amplifier 130. In one example embodiment, processor 106 may process the channel signal strength estimates received from channel signal strength estimation module 138 to produce, for example, an RSSI value or an RSRP value for those channels for which channel signal strength estimates were received.

As described above, components in receiver 114 may support the efficient generation of channel received signal strength estimates. Specifically, RF filter 122 may be configured to pass a frequency range that includes a plurality of channels, power density spectrum estimation module 134 may be configured to generate a power density spectrum for the frequency range passed by RF filter 122, and channel signal strength estimation module 138 may be configured to generate a channel signal strength estimate for each channel within the frequency range passed by RF filter 122. Further, in at least one example embodiment, processor 106 may be configured to generate one or more high level channel signal strength parameters, for example, an RSSI value or an RSRP value, based on the channel signal strength estimates generated by channel signal strength estimation module 138.

For example, in operation as a receiver, low noise amplifier 120 may receive an RF signal from antenna 102 via transmission/receiver switch 110. Low noise amplifier 140 may amplify the received signal by a predetermined gain and may pass the amplified signal to RF filter 122.

RF filter 122 may be configured to pass a frequency range with a maximum user equipment bandwidth, Ue_Bw, that may represent the maximum bandwidth that may be passed by RF filter 122. The frequency range passed by RF filter 122 may include multiple communication channels, as described in greater detail below and, therefore, may pass to down-conversion module 124 a filtered RF signal that includes frequency components for multiple communication channels.

Down-conversion module 124 may down-convert the received filtered RF signal using a local oscillator signal having a frequency that retains communication channel frequency components and having a phase controlled by a controller such as a digital controller module 140 based on phase locked loop control parameters received from processor 106, and may pass the down-converted signal to amplifier 130.

Amplifier 130 may amplify the down-converted signal based on automatic gain control signals received from digital control module 140 based on control parameters received from processor 106, and may pass the amplified, down-converted signal to analog-to-digital converter 132.

Analog-to-digital converter 132 may be configured to sample the down-converted signal at a predetermined sampling rate and to generate a digital data stream based on the sampled values which may be provided to demodulation module 136 and power density spectrum estimation module 134.

Power density spectrum estimation module 134 may receive the digital data stream and may generate power density spectrum data based on the digital data stream. The power density spectrum data may provide a power density for frequencies within the frequency range passed by RF filter 122 spaced by a predetermined resolution, e.g., 100 kHz. For example, in one example embodiment, power density spectrum estimation module 134 may pass the received digital data stream through a fast Fourier transform engine to convert the digital data stream to the frequency domain and may organize the fast Fourier transform engine output to produce power density spectrum data. In another example embodiment, power density spectrum estimation module 134 may pass the received digital data stream through a bank of digital filters, the bank of digital filters having one or more digital filters for each communication channel, and may use the digital filter output as the basis for producing the power density spectrum data.

It is noted that power density spectrum estimation module 134 may be tailored to support the generation of power density data for different types of channel signal strength estimates. For example, if RSRP values are to be produced, power density spectrum estimation module 134 may multiply a digital data stream generated by analog-to-digital converter 132 by a cell specific pilot pattern, or cell specific code, and may generate power density values for time/frequency bins corresponding to the cell specific pilot pattern. For example, in one example embodiment, power density spectrum estimation module 134 may include a plurality of digital filters, one filter per communication channel. However, if RSSI values are to be produced, power density spectrum estimation module 134 may generate power density values for frequency/time bins based on the full digitized data stream generated by analog-to-digital converter 132, since RSSI values may reflect the power of all the transmitted signals and noises.

Channel signal strength estimation module 138 may receive power density spectrum data from power density spectrum estimation module 134 and may generate channel signal strength estimates based on the received power density spectrum data. For example, in one example embodiment, channel signal strength estimation module 138 may sum the power density spectrum data for time/frequency bins associated with a communication channel to produce a signal strength estimate for the channel. Channel signal strength estimation module 138 may provide channel signal strength estimates to processor 106, which may further process the channel signal strength estimates to produce one or more high level channel received signal strength parameters, for example, an RSSI value or an RSRP value, based on the channel signal strength estimates generated by channel signal strength estimation module 138.

Demodulation module 136 may receive the digital data stream produced by analog-to-digital converter 132, may demodulate a portion of the digital data stream associated with the currently selected communication channel, and may provide the demodulated data stream to processor 106 for further processing and/or for delivery to one or more device components 108, as described above.

Figure 2:
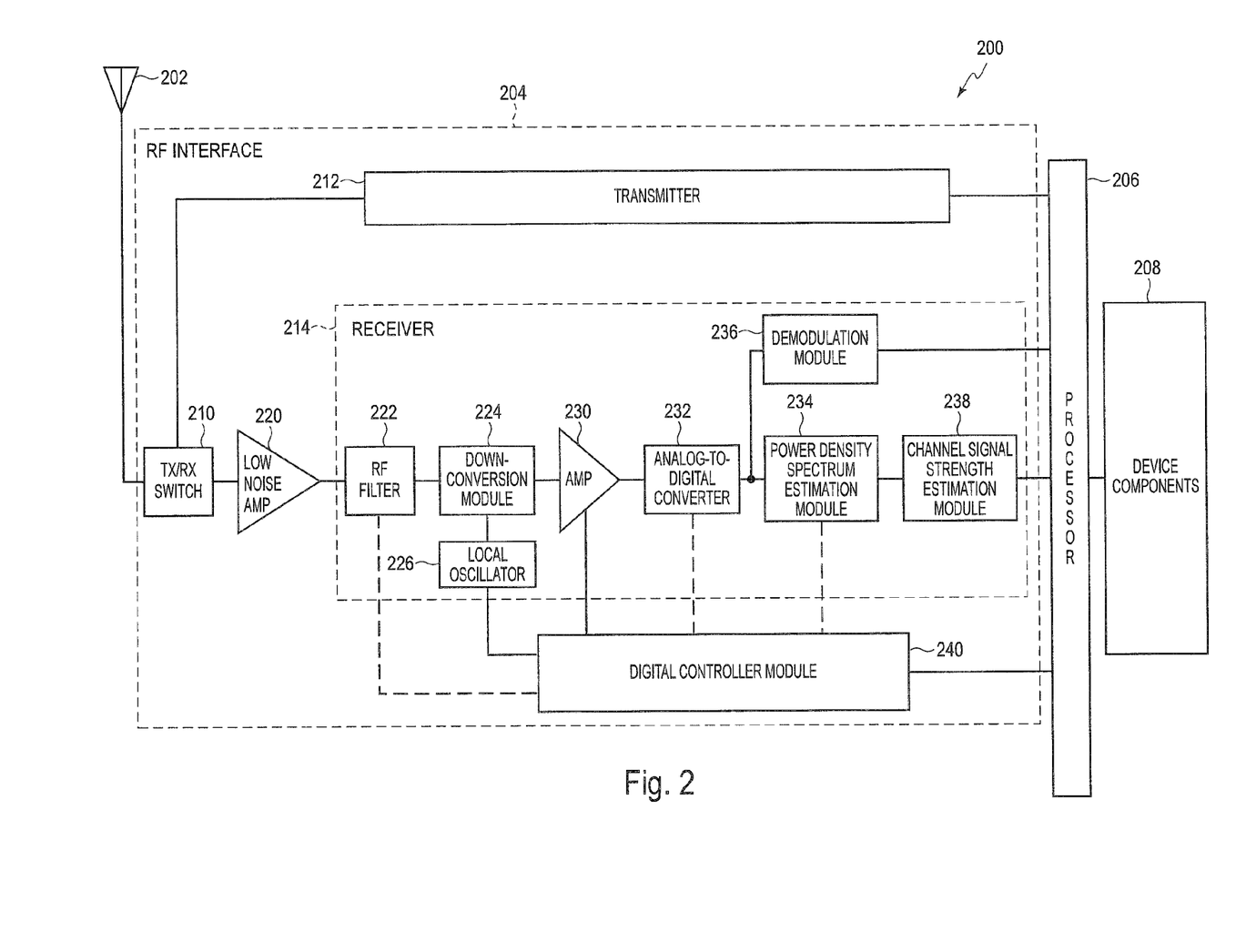
FIG. 2 is a block diagram of a second example of an RF receiver with improved communication channel received signal strength estimation capability.

FIG. 2 presents a system level block diagram of a second example of a cellular radio frequency (RF) transceiver 200, or user equipment, with a receiver that includes the described communication channel received signal strength estimation capability. Transceiver components in FIG. 2 are similar to those described above with respect to FIG. 1 and are identified with like numeric labels in which the first numeral has been changed to a "2" and subsequent numerals correspond with the labels of corresponding components described above with respect to FIG. 1. Features in FIG. 2 that have been fully described above with respect to FIG. 1 are not again described below. In the example embodiment shown in FIG. 2, RF filter 222, down-conversion module 224, local oscillator 226, amplifier 230, and analog-to-digital converter 232, may be referred to collectively as an example embodiment of a receiver front end.

Transceiver 200 shown in FIG. 2 differs from transceiver 100, described above with respect to FIG. 1, in that transceiver 200 may be used to generate channel signal strength estimates for communication channels spread across a frequency range with a bandwidth greater than the maximum user equipment bandwidth, Ue_Bw, described above with respect to FIG. 1. For example, in one example embodiment, transceiver 200 may first be configured to produce channel signal strength estimates for communication channels within a first frequency range with a bandwidth of Ue_Bw. Once the communication channels within the first frequency range have been processed, transceiver 200 may be dynamically reconfigured to produce channel signal strength estimates for communication channels within subsequent, e.g., an adjacent, frequency ranges with a bandwidth of Ue_Bw. In this manner, transceiver 200 may produce channel signal strength estimates for communication channels spread across a frequency range with a bandwidth greater that Ue_Bw.

For example, as shown in the example embodiment of transceiver 200 in FIG. 2, one or more of RF filter 222, analog-to-digital converter 232 and power density spectrum estimation module 234 may support connections with digital controller module 240 that allows each module to be dynamically reconfigured to process a next portion, e.g., of bandwidth Ue_Bw, of the frequency spectrum. In this manner, transceiver 200 may be used to generate channel signal strength estimates for a broader frequency range that could otherwise be achieved.

Figure 3:
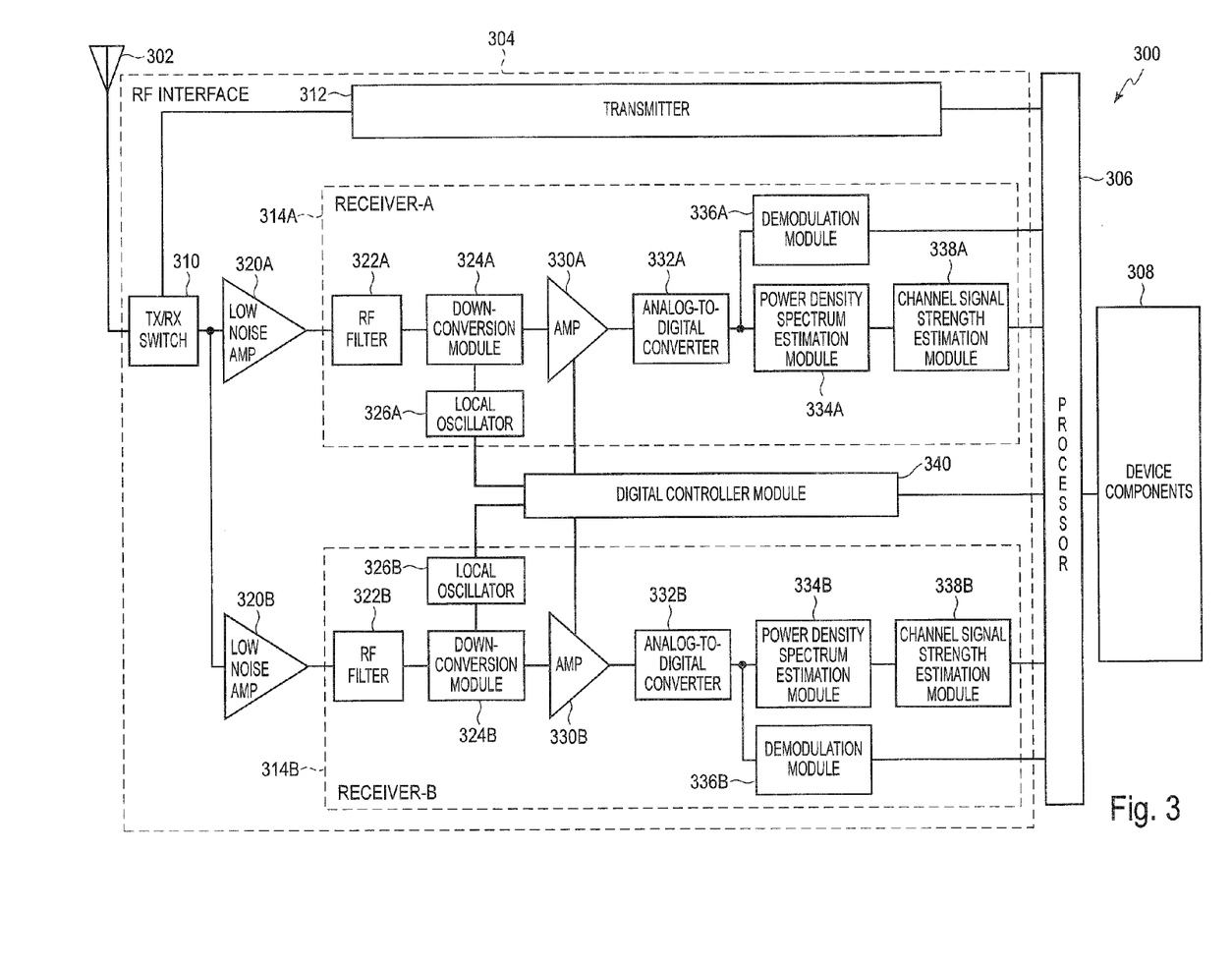
FIG. 3 is a block diagram of a third example of an RF receiver with improved communication channel received signal strength estimation capability.

For example, in one example embodiment, RF filter 222 may be configured by digital controller module 240 to pass a first portion of a frequency spectrum, of bandwidth Ue_Bw, that may be further processed by subsequent modules within receiver 214, e.g., down conversion module 224, amplifier 230, analog-to-digital converter 232, power density spectrum estimation module 234 and channel signal strength estimation module 238, to produce channel signal strength estimates that may be provided to processor 206 for use in support of higher level functions such as base station and/or communication channel selection, transmit power control (TPC) techniques, base station hand-off protocols., etc. Once the first portion of the frequency spectrum is processed, RF filter 122 may be reconfigured to pass a second frequency spectrum portion, of bandwidth Ue_Bw, for processing in a similar manner to produce channel signal strength estimates for channels within next portion of the frequency spectrum which, again, may be provided to processor 206. The above-described process may be repeated multiple times until channel signal strength estimates have been generated for all channels within a frequency spectrum of interest. In this manner, transceiver 200 may produce channel signal strength estimates for a frequency spectrum with a bandwidth greater than the maximum bandwidth, Ue_Bw, that may be processed by receiver 214 during any single processing cycle FIG. 3 presents a system level block diagram of a third example of a cellular radio frequency (RF) transceiver 300, or user equipment, with a receiver that includes the described communication channel received signal strength estimation capability. The transceiver components in FIG. 3 are similar to those described above with respect to FIG. 1 and FIG. 2 and corresponding features are identified with like numeric labels in which the first numeral has been changed to a "3" and subsequent numerals match the labels of the corresponding features in FIG. 1 and FIG. 2. Features in FIG. 3 which have been fully described above with respect to FIG. 1 and FIG. 2 are not again described below.

Transceiver 300 shown in FIG. 3 differs from transceiver 200, described above with respect to FIG. 2, in that, in accordance with an example embodiment, transceiver 300 may include two or more receivers 314A and 314B, and each receiver may be configured to process separate portions of a frequency range, simultaneously. In the example embodiment shown in FIG. 3, the two or more receivers 314A and 314B included in transceiver may be referred to collectively as an example embodiment of a receiver front end.

For example, as shown in FIG. 3, transceiver 300 may include a first receiver 314A and a second receiver 314b which may be configured in parallel between, for example, transmit/receiver switch 310 and processor 324. Each of first receiver 314A and second receiver 314B may include components similar to those described above with respect to receiver 114 with respect to FIG. 1, or receiver 214 with respect to FIG. 2. However, first receiver 314A may be configured to produce channel signal strength estimates for communication channels within a first frequency range with a bandwidth of Ue_Bw, and second receiver 314B may be configured to produce channel signal strength estimates for communication channels within a second frequency range, e.g., of bandwidth Ue_Bw. Additional receivers, each covering other frequency ranges, may also be provided. In this manner, transceiver 300 may be used to generate channel signal strength estimates for a broader frequency range that could otherwise be achieved. Transceiver 300 and transceiver 200, described above with respect to FIG. 2, differ from transceiver 100, described above with respect to FIG. 1, in that both transceiver 300 and transceiver 200 can produce channel signal strength estimates for communication channels spread across a frequency range greater than a single receiver concurrent bandwidth Ue_Bw. However, transceiver 300 and transceiver 200 differ in that transceiver 200 may process a frequency range by processing portions of the frequency range, e.g., of bandwidth Ue_Bw in series, while transceiver 300 may process a frequency range by processing portions of the frequency range, i.e., of bandwidth Ue_Bw in parallel.

For example, in one example embodiment, RF filter 322A of first receiver 314A may be configured by digital controller module 340 to pass a first portion of a frequency spectrum of bandwidth Ue_Bw that may be further processed by subsequent modules within first receiver 314A, e.g., down conversion module 324A, amplifier 330A, analog-to-digital converter 332A, power density spectrum estimation module 334A and channel signal strength estimation module 338A, to produce channel signal strength estimates that may be provided to processor 306 for use in support of higher level functions such as base station and/or communication channel selection, transmit power control (TPC) techniques, base station hand-off protocols., etc. Further, RF filter 322B of second receiver 314B may be configured by digital controller module 340 to pass a second portion of a frequency spectrum of bandwidth Ue_Bw that may be further processed by subsequent modules within second receiver 314B, e.g., down conversion module 324B, amplifier 330B, analog-to-digital converter 332B, power density spectrum estimation module 334B and channel signal strength estimation module 338B, to produce channel signal strength estimates that may be provided to processor 306 for use in support of higher level functions such as base station and/or communication channel selection, transmit power control (TPC) techniques, base station hand-off protocols., etc.

Figure 4:
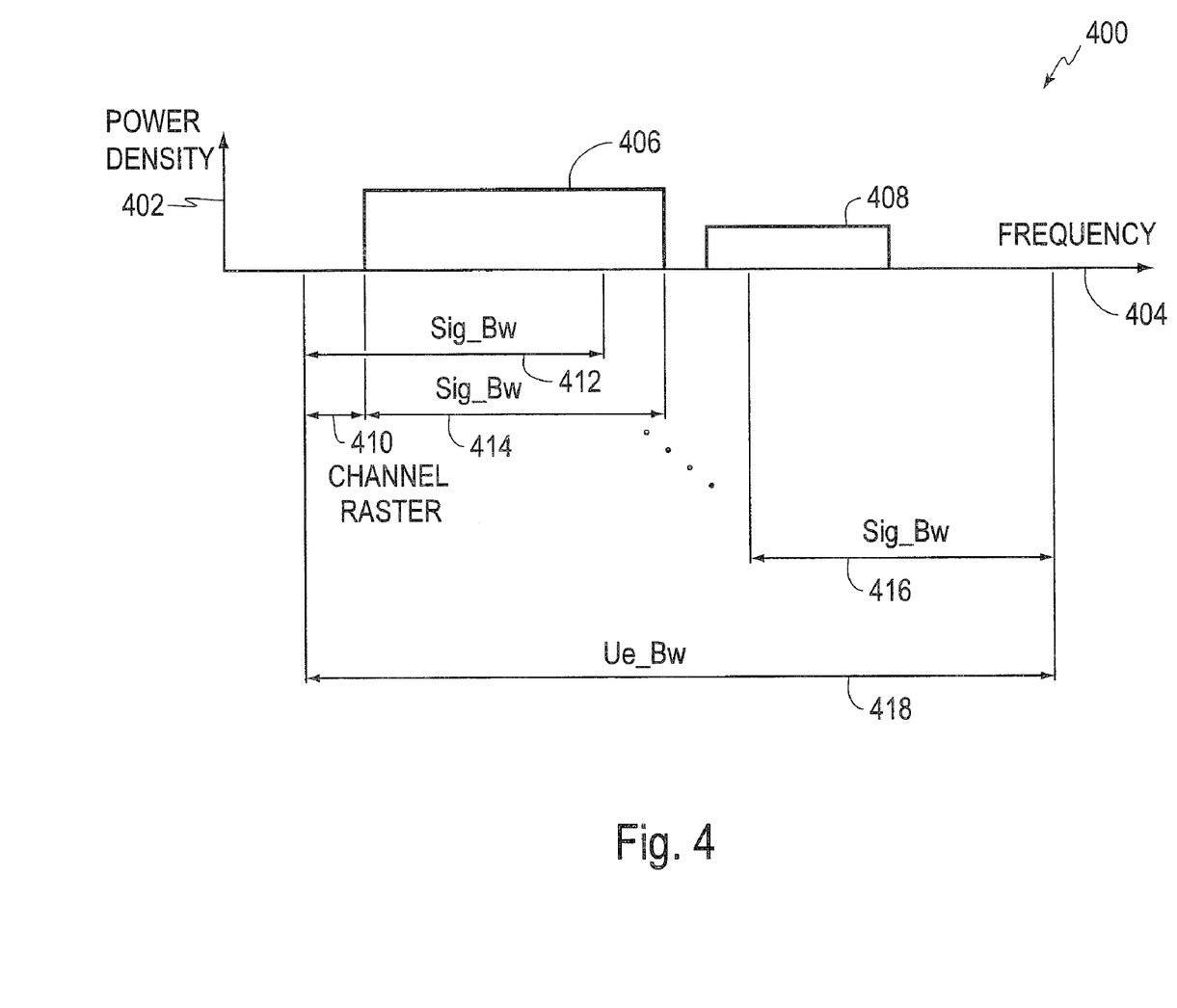
FIG. 4 is a plot of an example of a first power density spectrum for use in describing operation of the first example of an RF receiver with improved communication channel received signal strength estimation capability, as described with respect to FIG. 1.

FIG. 4 is a plot of an example power density spectrum that may be associated with a first incoming RF signal processed by, for example, transceiver 100, described above with respect to FIG. 1. As shown in FIG. 4, such power density spectrum data may be plotted as an X-Y coordinate plot 400 that may include a y-axis, or power density axis 402, and an x-axis, or frequency axis 404. The data plotted in X-Y coordinate plot 400 includes, first channel power density values 406, and second channel power density values 408. Also shown in FIG. 4 is a channel raster bandwidth, or, ChannelRaster, 410, a first signal bandwidth, or first Sig_Bw, 412, a second signal bandwidth, or second Sig_Bw, 414, a third signal bandwidth, or third Sig_Bw, 416, and a user equipment bandwidth, or Ue_Bw, 418.

Each signal bandwidth, Sig_Bw, shown in FIG. 4 relative to the frequency-axis, may represent a frequency spectrum associated with a communication channel. The user equipment bandwidth, Ue_Bw, may represent the maximum frequency bandwidth that may be supported by an example receiver, e.g., such as receiver 114 described above with respect to FIG. 1, and when oriented relative to the frequency-axis, as shown in FIG. 4, may be used to mark a frequency range supported by a receiver with a single RF filter preconfigured to support a single frequency range with a bandwidth of Ue_Bw, e.g., such as receiver 114 described above with respect to FIG. 1. The channel raster, or ChannelRaster, defines a staggered spacing between overlapping communication channel frequency spectrums within the frequency range defined by the user equipment bandwidth, Ue_Bw.

As shown in FIG. 4, first channel power density values 406 align with the communication channel associated with second signal bandwidth 414. Second channel power density values 408 only partially with third signal bandwidth 416 and include less power than first channel power density values 406. As a result, the channel signal strength estimate produced by channel signal strength estimation module 138 based on second channel power density values 408 will be less than the channel signal strength estimate produced based on first channel power density values 406, as described in greater detail below.

It is noted that although the example channel power density data presented in X-Y coordinate plot 400 at each of first channel power density values 406 and second channel power density values 408 is presented as a constant value, actual channel power density data may be affected by noise and/or other factors which may cause actual channel power density data to vary within the frequency range assigned to a communication channel. Also, it is noted that, depending on the protocol supported, the frequencies associated with a communication channel may be interspersed with frequencies associated with other communication channels.

RF transceiver 100, described above with respect to FIG. 1, may be configured to generate channel signal strength estimates for a single frequency range, as shown in FIG. 4 at Ue_Bw 418, that includes a plurality of overlapping channels with overlapping frequency ranges, as shown in FIG. 4 at Sig_Bw 412, Sig_Bw 414, and Sig_Bw 416. However, RF transceiver 100, described above with respect to FIG. 1, may not be dynamically configurable and, therefore, may not be able to scan a frequency bandwidth greater than Ue_Bw to allow receiver 114 to scan channels outside of a single user equipment maximum bandwidth, as shown in FIG. 4 at Ue_Bw 418.

Figure 5:
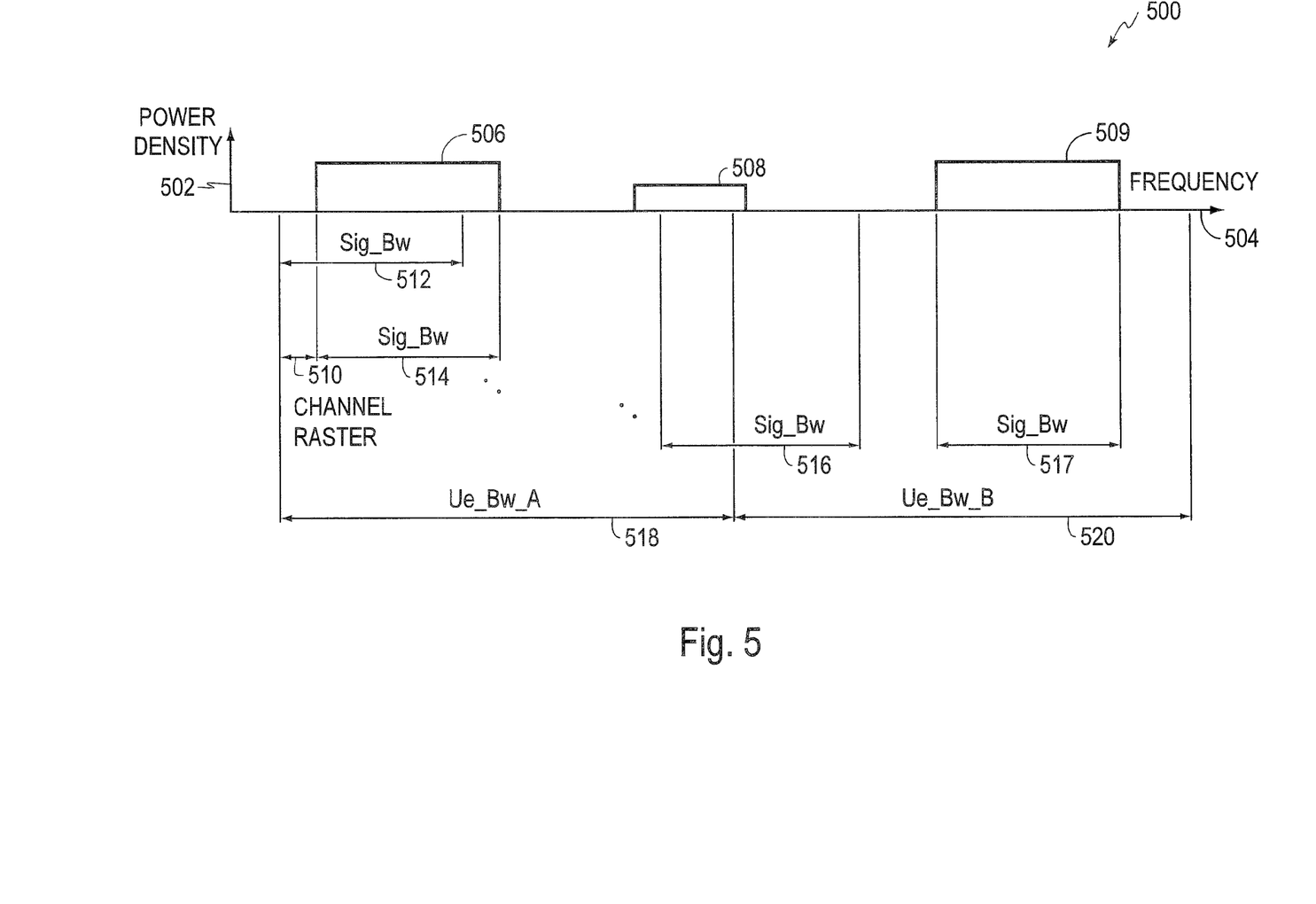
FIG. 5 is a plot of an example of a second power density spectrum for use in describing operation of the second and third examples of an RF receiver with improved communication channel received signal strength estimation capability, as described with respect to FIG. 2 and FIG. 3.

FIG. 5 is a plot of a second example power density spectrum, plotted as an X-Y coordinate plot 500 that may include a y-axis, or power density axis 502, and an x-axis, or frequency axis 504. The data plotted in X-Y coordinate plot 500 includes, first channel power density values 506, a second channel power density values 508, and a third channel power density values 509. The power density spectrum data shown in FIG. 5, differs from the power density spectrum described above with respect to FIG. 4, in that the power density spectrum data spans a frequency spectrum with a bandwidth greater than a single user equipment bandwidth Ue_Bw. As shown in FIG. 5, the second example of power density spectrum data spans a frequency range of a first user equipment bandwidth 518, Ue_Bw_A, and a second user equipment bandwidth 520, Ue_Bw_B. For example, first channel power density values 506 lay within a frequency range within first user equipment bandwidth 518, second channel power density values 508 lay within a frequency range that spans first user equipment bandwidth 518 and a second user equipment bandwidth 520, and third channel power density values 509 lay within a frequency range within a second user equipment bandwidth 520. As a result, the channel signal strength estimate produced by a channel signal strength estimation module based on second channel power density values 508 will be less than the channel signal strength estimate produced based on channel power density values 506 and 509, as described in greater detail below.

Also shown in FIG. 5 is a channel raster bandwidth, or ChannelRaster, 510, a first signal bandwidth, or first Sig_Bw, 512, a second signal bandwidth, or second Sig_Bw, 514, a third signal bandwidth, or third Sig_Bw, 516, and a fourth signal bandwidth, or fourth Sig_Bw 517. Each signal bandwidth, Sig_Bw, shown in FIG. 5 relative to the frequency-axis, may represent a frequency spectrum associated with a communication channel. The user equipment bandwidth, Ue_Bw, may represent the maximum frequency bandwidth that may be supported by an example receiver during a single processing cycle, e.g., such as receiver 214 described above with respect to FIG. 2. The channel raster, or ChannelRaster, defines a staggered spacing between overlapping communication channel frequency spectrums within the frequency range defined by the user equipment bandwidth, Ue_Bw. Each of the signal bandwidth are mutually separated by an integer multiple of ChannelRaster 510 spacing.

It is noted that although the example channel power density data presented in X-Y coordinate plot 500 is presented as constant values, actual channel power density data may be affected by noise and/or other factors which may cause actual channel power density data to vary within the frequency range assigned to a communication channel. Also note that, depending on the protocol supported, the frequencies associated with a communication channel may be interspersed with frequencies associated with other communication channels.

RF transceiver 100, described above with respect to FIG. 1, may be configured to generate channel signal strength estimates for a single frequency range, as shown in FIG. 5 at Ue_Bw_A 518, that includes a plurality of overlapping channels with overlapping frequency ranges, as shown in FIG. 5 at Sig_Bw 512, and Sig_Bw 514. However, RF transceiver 100, described above with respect to FIG. 1, may not be dynamically configurable and, therefore, may not be able to scan a frequency bandwidth greater than Ue_Bw to allow receiver 114 to scan channels outside of a single user equipment maximum bandwidth, as shown in FIG. 5 at Sig_Bw 516 and Sig_Bw 517.

Transceivers that do not include the described channel signal strength estimation approach may measure channel signal strength estimates, e.g., generate RSSI, RSRP values, for a single channel at an expected channel signal frequency and expected channel signal bandwidth. Each time a channel signal strength is generated, such a transceiver may tune an embedded receiver to a carrier frequency associated with a selected channel and may measure a total power for that channel base on a predetermine channel bandwidth associated with the selected channel. Such a processing cycle may require, including the time for PLL and AGC stabilization, approximately 1 msec. Therefore, such a transceiver would require 65 cycles, i.e., 65 msec, to generate channel signal strength estimates for 65 channels within an 18 MHz frequency range (assuming each channel is 5 MHz).

In contrast, in accordance with embodiments of the invention, the receiver bandwidth may be opened to a bandwidth greater than a single communication channel bandwidth, e.g., at least 200 kHz greater than the signal bandwidth, and may measure in parallel the power associated with each channel within the receiver bandwidth. In this manner, time consuming tuning to a particular selected expected channel may be avoided. The wider the signal bandwidth received, the greater the number of received channels that may be processed in parallel and for which estimates of channel signal strength may be generated. Therefore, a transceiver that incorporates the described channel signal strength estimation approach may generate channel signal strength estimates for the 65 possible channels within the 18 MHz (assuming each channel is 5 MHz) with a single processing cycle, or approximately 1 msec.

Equation 1, below, may be used to determine the number of communication channels, N, for which channel signal strength estimates may be generated by a transceiver with a receiver with an RF filter bandwidth, Ue_Bw, that may pass a fixed RF spectrum of bandwidth Ue_Bw, such as embodiments of the example transceiver described above with respect to FIG. 1.

$$N = 1 + \left\lfloor \frac{UE\_Bw - Sig\_Bw}{ChannelRaster} \right\rfloor \qquad \text{Eq. 1}$$

Where N is the number of communication channels;
Ue_Bw is a frequency bandwidth that may be processed by a single receiver unit in a single processing cycle;
Sig_Bw is the frequency bandwidth of a single channel; and
ChannelRaster is the separation between start points of separate channels.

Equation 2, below, may be used to determine the number of communication channels, N, for which channel signal strength estimates may be generated by a transceiver capable of processing a signal frequency range with a bandwidth that includes multiple RF filter maximum bandwidths, Ue_Bw. For example, such a transceiver may include a single receiver with a single RF filter that may be dynamically reconfigured, such as transceiver 200 described above with respect to FIG. 2, or such a transceiver may include multiple receivers, each with a single RF filter that is configured to pass different portions of a frequency spectrum in parallel, such as transceiver 300 described above with respect to FIG. 3.

$$N = 1 + \left\lfloor \frac{M * Ue\_Bw - Sig\_Bw}{ChannelRaster} \right\rfloor \qquad \text{Eq. 2}$$

Where M is the number of adjacent frequency ranges of bandwidth Ue_Bw processed in sequence or parallel processing cycles to generate channel signal strength estimates for channels within a frequency range of bandwidth M*Ue_Bw.

As described above with respect to FIG. 1, FIG. 2 and FIG. 3, power density spectrum data generated by a receiver's power density spectrum estimation module may be processed by a channel signal strength estimation module to generate measures of channel signal strength, e.g., such as RSSI and RSRP values. For example, in a transceiver embodiment in which the channel signal strength estimation module is configured to generate an RSSI value, power density spectrum data values produced by the power density spectrum estimation module may be summed for the respective communication channel frequency ranges as described with respect to equation 3, below.

$$RSSI(K) = \sum_{M=0}^{Sig\_Bw/resolution} P(M*resolution + K*ChannelRaster) \qquad \text{Eq. 3}$$

Where K identifies a single communication channel;

Sig_Bw is the frequency bandwidth of a single channel;

ChannelRaster is the separation between start points of separate channels;

Resolution indicates a frequency separation, e.g., 100 kHz, between power density spectrum data values;

K*ChannelRaster identifies a frequency start-point of a channel for which power density values have been generated;

M*resolution identifies a frequency offset from the channel start-point (K*ChannelRaster); and P(M*resolution+K*ChannelRaster) identifies a specific frequency for which a power density spectrum data value has been generated and stored.

For example, assuming that a communication protocol standard, e.g., a UMTS-WCDMA standard, defines communication channels with a channel bandwidth, Sig_Bw, of 3.84 Mhz and a channel raster of 200 kHz, a transceiver device with a receiver having a maximum concurrent receiver bandwidth, Ue_Bw, of 5 MHz would be able to scan a frequency range of 10 MHz by processing two 5 MHz scans. Based on equation 2, above, by executing 2 RSSI measurement processing cycles, a transceiver such as transceiver 200 which may process each of the 5 MHz frequency ranges in succession may generate N=1+(2*5−3.84)/0.2, or 31.8, channel signal strength measurements in the same time that 2 channel signal strength measurements could be performed using previous approaches. Further, based on equation 2, above, by processing 2 RSSI measurements, a transceiver such as transceiver 300 which may process each of the 5 MHz frequency ranges in parallel may generate N=1+(2*5−3.84)/0.2, or 31.8, channel signal strength measurements in the same time that a single channel signal strength measurements could be performed using previous approaches.

Figure 6:
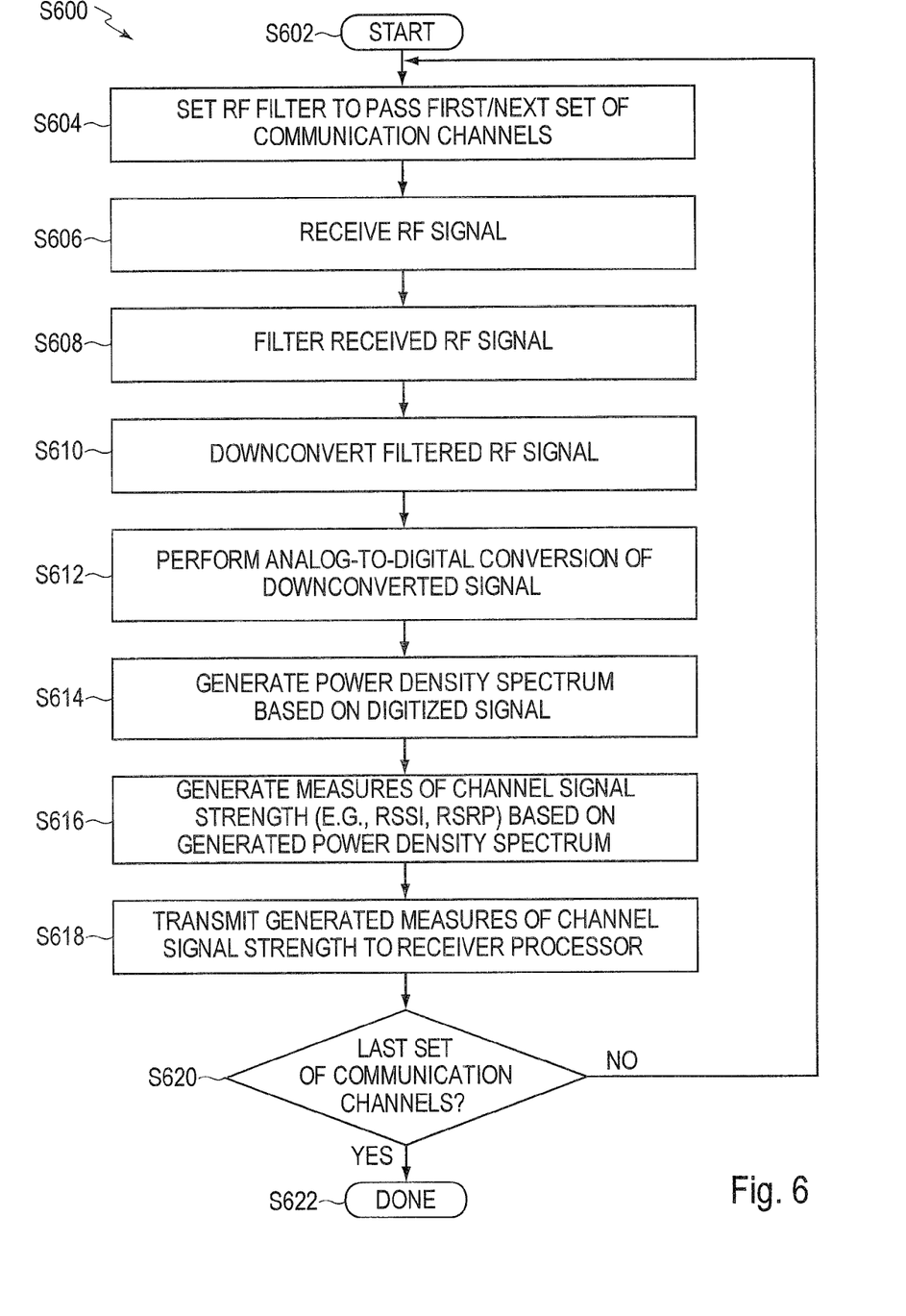
FIG. 6 shows a flow-chart of a process example for generating communication channel received signal strength estimates using an RF receiver as described above with respect to FIG. 1.

FIG. 6 shows a flow-chart of a process for generating communication channel received signal strength estimates using an RF transceiver, such as the transceivers described above with respect to FIG. 1, FIG. 2 and FIG. 3, that includes the described communication channel received signal strength estimation capability. As shown in FIG. 6, operation of the method begins at step S602 and proceeds to step S604.

In step S604, a receiver is configured, either statically, or dynamically, to pass a first/next frequency spectrum with a frequency bandwidth that includes multiple communication channels, and operation of the method continues to step S606.

In step S606, an RF signal is received, and operation of the method continues to step S608.

In step S608, the received RF signal is filtered, and operation of the method continues to step S610.

If, in step S610, the filtered RF signal is down-converted, and operation of the method continues to step S612.

In step S612, an analog-to-digital conversion is performed to convert the analog down-converted signal to a digital data stream, and operation of the method continues to step S614.

In step S614, the digital data stream is digitally processed, e.g., through a fast Fourier transform, or through a bank of digital filters, to generate power density data based on the digital signal stream, and operation of the method continues to step S616.

In step S616, measures of channel signal strength, e.g., RSSI values, RSRP values, etc., are generated based on the generated power density data, e.g., by summing power density values associated with a communication channel, and operation of the method continues to step S618.

In step S618, the generated measures of channel signal strength may be transmitted to a transceiver controller/processor, and operation of the method terminates at step S620.

If, in step S620, the last set of communication channels has not been processed, operation of the method proceeds to step S604, otherwise, operation of the method terminates at step S622.

Figure 7:
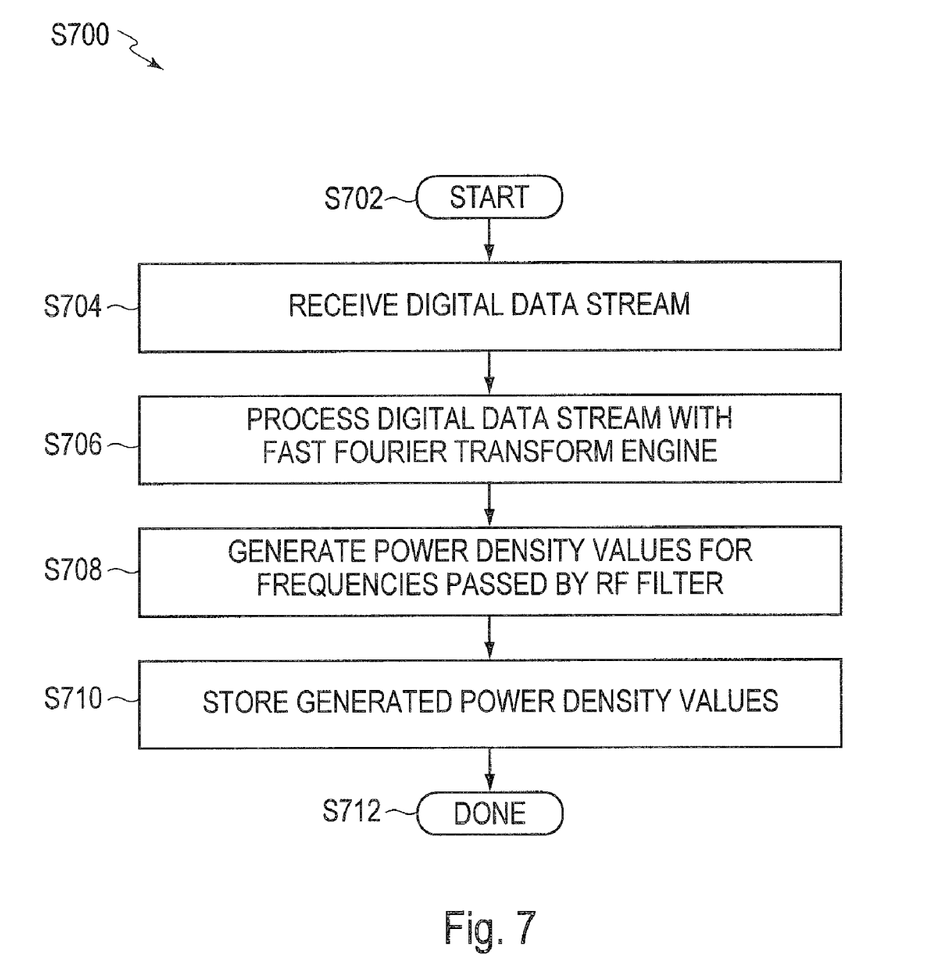
FIG. 7 shows a flow-chart of a process example for generating a power density spectrum data for an RF spectrum segment.

FIG. 7 shows a flow-chart of a process for generating power density spectrum data for an RF spectrum segment, as described above with respect to FIG. 6 at step S614. The process flow described below with respect to FIG. 7 may be implemented by a power density spectrum estimation module within a receiver, as described above with respect to FIG. 1, FIG. 2 and FIG. 3. As shown in FIG. 7, operation of the method begins at step S702 and proceeds to step S704.

In step S704, a digital data stream is received, and operation of the method continues to step S706.

In step S706, the received digital data stream may be digitally processed, e.g., via a fast Fourier transform or a bank of digital filters, and operation of the method continues to step S708.

In step S708, power density values for frequencies passed by the receiver RF filter may be generated based on the results of fast Fourier transform or digital filters, and operation of the method continues to step S710.

In step S710, the generated power density values may be stored in association with their respective RF frequencies, and operation of the method terminates at step S712.

It should be noted that in steps S706 and S708, if RSRP values are to be generated, a received digital data stream may be multiplied by, i.e., filtered by, a cell specific pilot pattern, or cell specific code, and power density values may be generated for time/frequency bins based on the digital data passed by the cell specific pilot pattern. However, if RSSI values are to be generated, power density values may be generated for frequency/time bins based on the full digitized data stream received in step S702, since RSSI values may reflect the power of the transmitted signal and noise.

Figure 8:
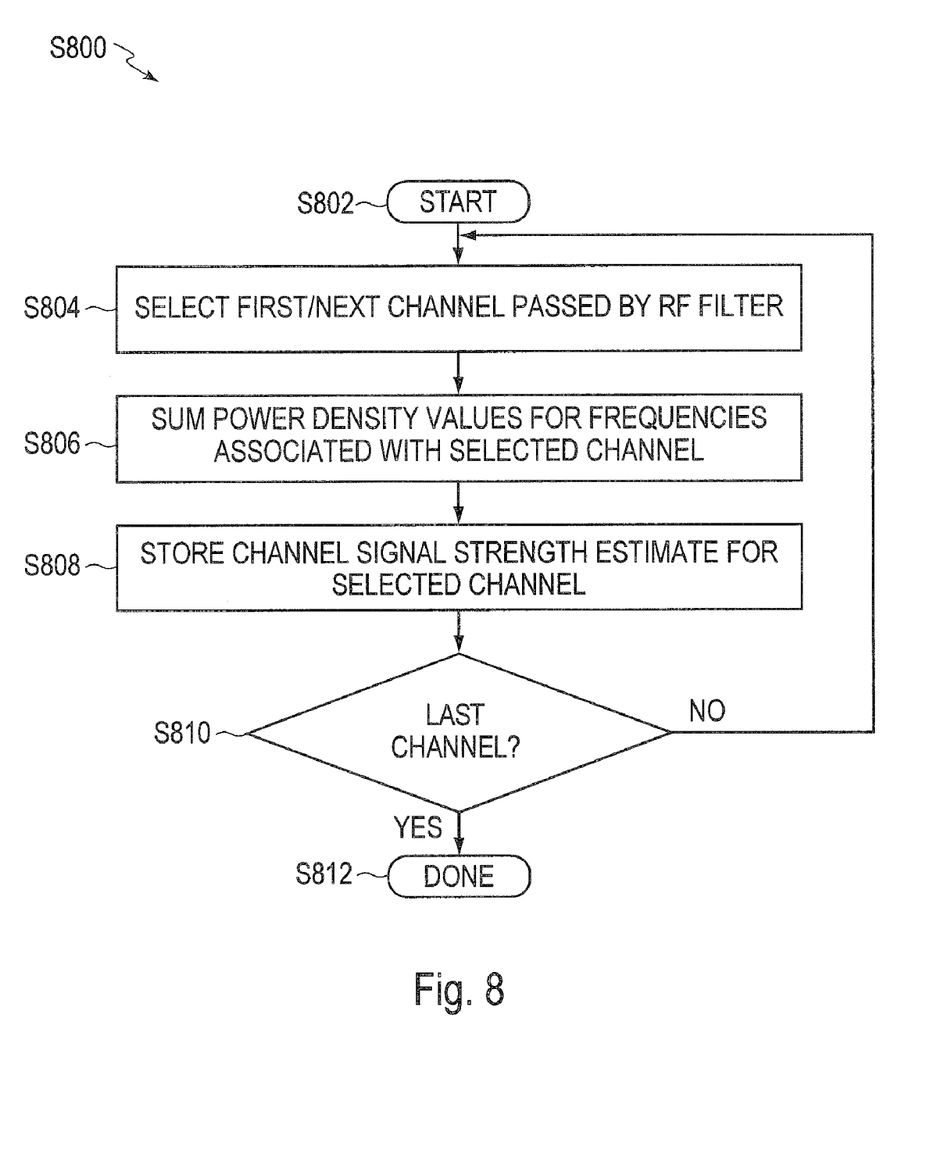
FIG. 8 shows a flow-chart of a process example for generating received signal strength estimates based on the power density spectrum data generated for an RF spectrum segment.

FIG. 8 shows a flow-chart for a process for generating received signal strength estimates based on the power density spectrum generated for an RF spectrum segment, as described above with respect to FIG. 6 at step S616. The process flow described below with respect to FIG. 8 may be implemented by a power density spectrum estimation module within a receiver, as described above with respect to FIG. 1, FIG. 2 and FIG. 3. As shown in FIG. 8, operation of the method begins at step S802 and proceeds to step S804.

In step S804, a first/next communication channel associated with frequencies passed by the receiver RF filter, as described above, is selected, and operation of the method continues to step S806.

In step S806, power density values associated with the selected communication channel may be summed, for example, using the summation approach described above with respect to equation 3, above, and operation of the method continues to step S808.

In step S808, the channel signal strength summation value is formatted as a channel signal strength estimate, e.g., an RSSI value or RSRP value, and operation of the method continues to step S810.

If, in step S810, the power density spectrum estimation module determines that a channel signal strength estimate has not been generated for the last communication channel in the frequency range being processed, operation of the method proceeds to step S804, otherwise, operation of the method terminates at step S812.

It is noted that the described RF receiver with improved communication channel received signal strength estimation capability may be used in any receiver device that supports a communication protocol in which communication channel received signal strength may be determined for multiple communication channels.

It is also noted that the power density spectrum estimation module may use any digital processing technique that allows power density data to be generated for the frequencies within the bandwidth passed by the RF filter.

Further, the channel signal strength estimates based of the generated power density data are not limited to RSSI and/or RSRP values. The power density data may be formatted as needed to provide any channel received signal strength parameter defined by any existing or future communication protocol.

For purposes of explanation, in the above description, numerous specific details are set forth in order to provide a thorough understanding of the RF receiver with improved communication channel received signal strength estimation capability within RF transmitter/receiver devices in support of RF based communication. It will be apparent, however, to one skilled in the art that the RF receiver with improved communication channel received signal strength estimation capability may be practiced without these specific details. In other instances, well-known structures and devices are shown in block diagram form in order to avoid obscuring the features of the RF receiver with improved communication channel received signal strength estimation capability and the RF transmitter/receiver devices in which the RF receiver with improved communication channel received signal strength estimation capability may be used.

While the RF receiver with improved communication channel received signal strength estimation capability has been described in conjunction with the specific embodiments thereof, it is evident that many alternatives, modifications, and variations will be apparent to those skilled in the art. Accordingly, embodiments of the RF receiver with improved communication channel received signal strength estimation capability as set forth herein are intended to be illustrative, not limiting. There are changes that may be made without departing from the spirit and scope of the invention.

What is claimed is:

1. User equipment for use on a cellular communication network, comprising:
   a receiver front end that configured to receive signals in a bandwidth that defines a plurality of communication channels;
   a power density spectrum estimation module configured to generate a power density spectrum for the communication channels received over the bandwidth, multiply the bandwidth by cell specific code, and generate power density values based on a resulting product; and
   a channel signal strength estimation module that generates a measure of channel signal strength for each of the plurality of communication channels based on the power density spectrum.

2. The user equipment of claim 1, wherein the power density spectrum estimation module includes a Fourier transform engine that extracts frequency-domain signal power information.

3. The user equipment of claim 1, wherein the power density spectrum estimation module includes a plurality of digital filters, one digital filter per communication channel.

4. The user equipment of claim 1, wherein the channel signal strength estimation module includes a summation module that sums power levels from the power density spectrum for frequencies associated with each of the plurality of communication channels.

5. The user equipment of claim 4, wherein the measure of channel signal strength is a channel RSSI value.

6. The user equipment of claim 4, wherein the measure of channel signal strength is a channel RSRP value.

7. The user equipment of claim 1, wherein the bandwidth includes a plurality of channel bandwidths, each channel bandwidth encompassing all frequencies associated with one channel.

8. The user equipment of claim 7, wherein a start of a first channel bandwidth precedes a start of a second channel bandwidth by an integer multiple of a channel raster spacing.

9. The user equipment of claim 1, wherein the signals is received by the receiver front end in a first bandwidth that defines a first plurality of communication channels and a second bandwidth that includes defines a second plurality of communication channels, the receiver front end further comprises:
   an RF filter that is configurable to pass one of the first bandwidth and the second bandwidth.

10. A method for generating measures of channel signal strength for channel signals received by user equipment on a cellular communication network, comprising:
    receiving signals in a bandwidth that defines a plurality of communication channels;
    generating a power density spectrum for the communication channels defined over the bandwidth; and
    generating a measure of channel signal strength for each of the plurality of communication channels based on the power density spectrum by multiplying the bandwidth by a cell specific code and by generating power density values based on a resulting product.

11. The method of claim 10, wherein generating a power density spectrum includes processing the received signals in the bandwidth with a Fourier transform engine that extracts frequency-domain signal power information.

12. The method of claim 10, wherein generating a power density spectrum includes processing the received signals in the bandwidth with a plurality of digital filters, one digital filter per communication channel.

13. The method of claim 10, wherein generating a measure of channel signal strength includes summing power levels from the power density spectrum for frequencies associated with each of the plurality of communication channels.

14. The method of claim 13, wherein the measure of channel signal strength is a channel RSSI value.

15. The method of claim 13, wherein the measure of channel signal strength is a channel RSRP value.

16. The method of claim 10, wherein the signals are received in a plurality of channel bandwidths, each channel bandwidth encompassing all frequencies associated with one channel.

17. The method of claim 16, wherein a start of a first channel bandwidth precedes a start of a second channel bandwidth by an integer multiple of a channel raster spacing.

18. User equipment for use on a cellular communication network, comprising:
- a plurality of receivers, each receiver comprising:
    - a receiver front end configured to receive signals in a bandwidth that defines a plurality of communication channels;
    - a power density spectrum estimation module that generates a power density spectrum for the communication channels defined over the bandwidth; and
    - a channel signal strength estimation module that generates a measure of channel signal strength for each of the plurality of communication channels based on the power density spectrum, wherein each of the plurality of receivers is configured to process a different bandwidth.

19. The user equipment of claim 18, further comprising:
a user equipment processor that receives from each of the plurality of receivers measures of channel signal strengths for channels within the respective bandwidths processed by each respective receiver.

* * * * *